(12) United States Patent
Dai et al.

(10) Patent No.: US 11,104,752 B2
(45) Date of Patent: Aug. 31, 2021

(54) METHOD FOR INDUCING ORDERED ARRANGEMENT OF NANO-MICROSPHERES BY MEANS OF POLYMER CRYSTALLIZATION

(71) Applicant: Xiamen University, Xiamen (CN)

(72) Inventors: Lizong Dai, Xiamen (CN); Jihong Zhu, Xiamen (CN); Shangyue Chen, Xiamen (CN); Yuntong Li, Xiamen (CN); Conghui Yuan, Xiamen (CN); Guorong Chen, Xiamen (CN); Birong Zeng, Xiamen (CN); Yiting Xu, Xiamen (CN); Wei'ang Luo, Xiamen (CN)

(73) Assignee: Xiamen University, Xiamen (CN)

( * ) Notice: Subject to any disclaimer, the term of this patent is extended or adjusted under 35 U.S.C. 154(b) by 282 days.

(21) Appl. No.: 16/503,779

(22) Filed: Jul. 5, 2019

(65) Prior Publication Data

US 2019/0330398 A1 Oct. 31, 2019

Related U.S. Application Data

(63) Continuation of application No. PCT/CN2018/078813, filed on Mar. 13, 2018.

(30) Foreign Application Priority Data

Mar. 13, 2017 (CN) .......................... 201710146004.4

(51) Int. Cl.
*C08F 212/08* (2006.01)
*C08F 212/36* (2006.01)
*C08L 71/02* (2006.01)
*C08J 5/18* (2006.01)
*C08F 2/22* (2006.01)

(52) U.S. Cl.
CPC .......... *C08F 212/08* (2013.01); *C08F 212/36* (2013.01); *C08J 5/18* (2013.01); *C08L 71/02* (2013.01); *C08F 2/22* (2013.01); *C08J 2371/02* (2013.01); *C08J 2425/08* (2013.01); *C08L 2203/16* (2013.01); *C08L 2205/18* (2013.01)

(58) Field of Classification Search
CPC ...... C08F 212/08; C08F 212/36; C08L 71/02; C08J 5/18
USPC ....................................................... 524/501
See application file for complete search history.

(56) References Cited

FOREIGN PATENT DOCUMENTS

CN 102716703 A * 10/2012

* cited by examiner

*Primary Examiner* — Deve V Hall
(74) *Attorney, Agent, or Firm* — Cooper Legal Group, LLC

(57) ABSTRACT

Disclosed is a method for inducing orderly arrangement by means of polymer crystallization, and the use thereof in preparing a composite film. Firstly, monodisperse PS-DVB nano-microspheres of different sizes are prepared by means of soap-free emulsion polymerization; the PS-DVB nano-microspheres prepared above are used as raw material, and PEG aqueous solutions with different concentrations are added to induce an orderly arrangement of the nano-microspheres by means of solution-state PEG crystallization; and characterized by using scanning electron microscopy and polarizing microscopy. The method is simple in terms of operation and is widely applicable. By further modifying the orderly arrangement of the nano-microspheres, the composite material can be applied to different fields. The replacement of a substrate for crystalline polymer which inducing the orderly arrangement of the nano-microspheres enables the nano-composite material to become a thin film material or a bulk material modified and reinforced by the nano-microspheres.

8 Claims, 1 Drawing Sheet

METHOD FOR INDUCING ORDERED ARRANGEMENT OF NANO-MICROSPHERES BY MEANS OF POLYMER CRYSTALLIZATION

RELATED APPLICATIONS

This application is a continuation of and claims priority to PCT Application PCT/CN2018/078813, filed Mar. 13, 2018, which claims priority to Chinese Patent Application 201710146004.4, filed on Mar. 13, 2017. PCT Application PCT/CN2018/078813 and Chinese Patent Application 201710146004.4 are incorporated herein by reference.

FIELD OF THE INVENTION

The present disclosure relates to the field of crystallization of organic polymer compounds and nano-composite materials. More particularly, the present disclosure relates to a method for inducing orderly arrangement of nano-microspheres by means of polymer crystallization and use thereof in preparing a composite film.

BACKGROUND OF THE INVENTION

Nano-material and nano-composite material are widely applied in various fields, such as optoelectronics, microelectronics, aeronautics and astronautics, due to their unique structures and various excellent properties. A nano-microsphere is a typical structure of a nano-material with an orderly arranged body, thus having an advantage due to its controllable structure, and is applicable in the fields of optics and surface science. While various methods are applied for the orderly arrangement of nano-microspheres, each of the methods has its advantages and disadvantages, and scientific researchers are continuously attempting to seek a method that is simple in terms of operation and widely applicable.

SUMMARY OF THE INVENTION

To overcome the disadvantages of existing techniques, the present disclosure provides a new method for inducing orderly arrangement of nano-microspheres, which involves inducing an orderly arrangement of nano-microspheres by means of polymer crystallization, and use thereof in preparing a composite film.

The technical scheme adopted by the present invention is as follows:

a method for inducing an orderly arrangement of nano-microspheres by means of polymer crystallization; specifically, the method comprises the following steps:

mixing a PS-DVB nano-microsphere emulsion with a concentration of 8-12% (percent weight in volume) and a PEG (polyethylene glycol) aqueous solution with a concentration of 1-30% in a volume ratio of 1:3-5 to obtain a mixed solution, and inducing the orderly arrangement of the PS-DVB nano-microspheres according to a crystal growth direction of PEG crystal by means of PEG crystallization in the mixed solution.

In a preferred experimental scheme of the present disclosure, the PS-DVB nano-microsphere emulsion with a concentration of 8-12% is obtained by a method that includes:

1) mixing PS (polystyrene) and DVB (divinylbenzene), adding deionized water, adjusting the temperature to 75-85° C. under the conditions of nitrogen gas protection, stirring and reflux condensation, then adding an initiator aqueous solution with a concentration of 0.002-0.003 g/ml drop by drop, and reacting for 8-10 h; the volume ratio of the PS, the DVB and the initiator aqueous solution is in a range of 1-2:0.02-0.03:9-11;

2) washing a reaction product obtained in step 1) to obtain a plurality of PS-DVB (polystyrene-divinylbenzene) nano-microspheres and preparing a PS-DVB nano-microsphere emulsion, a concentration of the PS-DVD nano-microspheres in the PS-DVB nano-microsphere emulsion is 8-12%.

Firstly, PS-DVB nano-microspheres are prepared by soap-free emulsion, then solution-state PEG crystallization is applied to induce the orderly arrangement of the PS-DVB nano-microspheres, while different particle sizes of the PS-DVB nano-microspheres in monodisperse state may be obtained by controlling the amount of the DVB.

In a preferred experimental scheme of the present disclosure, an average particle size of the PS-DVB nano-microspheres is in a range of 400-500 nm.

In a preferred experimental scheme of the present disclosure, in step 3), the PEG crystallization in the mixed solution is assisted by a dripping film method, which includes: dropping the mixed solution on a pretreated flat glass substrate, and drying the glass substrate under a temperature of 20-40° C., inducing the orderly arrangement of the PS-DVB nano-microspheres according to a crystal growth direction of PEG crystal by means of PEG crystallization, and obtaining a composite film formed by an orderly arrangement of the PS-DVB nano-microspheres according to a crystal growth direction of PEG crystal on the glass substrate.

In a preferred experimental scheme of the present disclosure, in step 3), the PEG crystallization in the mixed solution is assisted by a vertical deposition method, which includes: vertically inserting a pretreated glass substrate into the mixed solution, drying under a temperature of 30-50° C. for 22-26 h, inducing the orderly arrangement of the PS-DVB nano-microspheres according to a crystal growth direction of PEG crystal by means of PEG crystallization, and obtaining a composite film formed by an orderly arrangement of the PS-DVB nano-microspheres according to a crystal growth direction of PEG crystal on the glass substrate.

In a preferred experimental scheme of the present disclosure, the initiator is potassium persulfate (KPS).

In a preferred experimental scheme of the present disclosure, the PEG is a polymer with molecular weight of 2000, i.e. PEG2000.

The technical scheme adopted by the present invention is as follows:

A use of preparing a composite film and other composite material according to the above method.

Compared to existing techniques, the present disclosure has the following beneficial effects:

(1) The present disclosure provides a new method for inducing the orderly arrangement of the nano-microspheres, i.e. applying means of polymer crystallization to induce the nano-microspheres to be arranged orderly according to a growth direction of dendritic crystals. The method is simple in terms of operation and widely applicable. By further modifying the orderly arrangement of the nano-microspheres, the composite material can be applied to different fields. The replacement of a substrate for a crystalline polymer that induces the orderly arrangement of the nano-microspheres enables the nano-composite material to become a thin film material or a bulk material modified and reinforced by the nano-microspheres.

(2) The PS-DVB (polystyrene-divinylbenzene) nano-microspheres of the present disclosure are prepared by means of soap-free emulsion polymerization, the surface of the nano-microspheres are clean, the post-treatment is simple, the preparation method is simple, mature technology is used, and the cost is low.

The present disclosure provides a method for inducing the orderly arrangement of the nano-microspheres and realized by the solution-state PEG crystallization, which is feasible in operation, simple in device, and better in repeatability.

BRIEF DESCRIPTION OF THE DRAWINGS

The present disclosure is further explained with the combination of the accompanying drawings together with the embodiments.

DETAILED DESCRIPTION OF THE EMBODIMENTS

The present disclosure is specifically described by the following embodiments:

Embodiment 1

Figure 1:
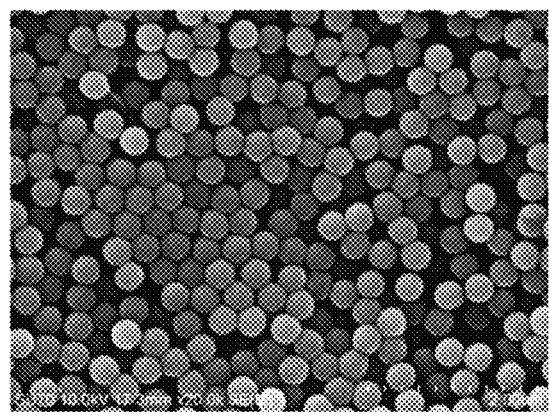
FIG. 1 illustrates a SEM (scanning electron microscope) photograph of the PS-DVB (polystyrene-divinylbenzene) nano-microspheres obtained by embodiment 1 of the present disclosure.
Figure 2:
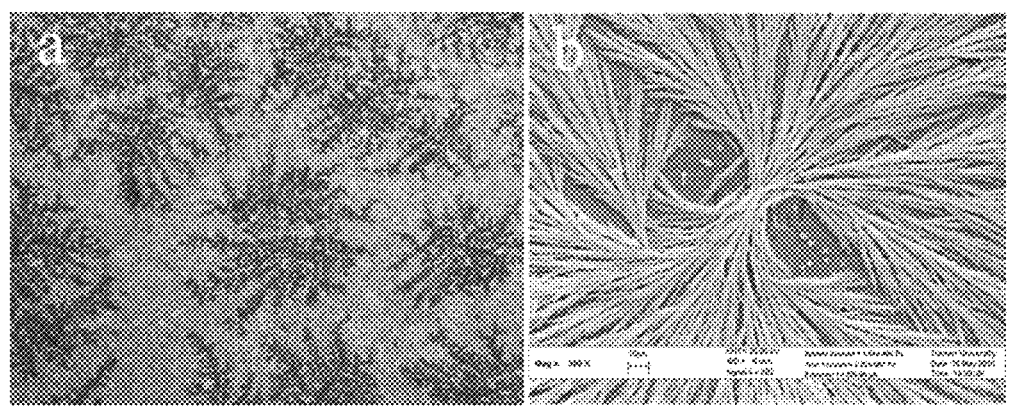
FIG. 2 illustrates an optical microscope-graph (a) and a SEM photograph (b) of the solution-state PEG crystallization obtained by embodiment 1 of the present disclosure.
Figure 3:
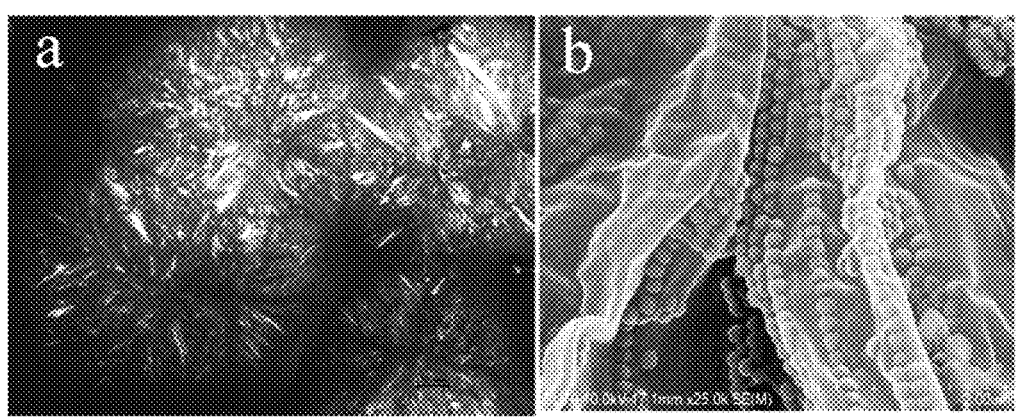
FIG. 3 illustrates a polarizing microscope-graph (a) and a SEM photograph (b) of inducing the orderly arrangement of the PS-DVB nano-microspheres by means of the solution-state PEG crystallization obtained by embodiment 1 of the present disclosure.

1) After adding 2 mL PS and 0.03 mL DVB into a 150 ml three-neck flask, adding 40 mL deionized water into the three-neck flask, mounting the three-neck flask, installing a condenser on the three-neck flask, after filling the condenser with cooling water and the three-neck flask with nitrogen gas, adding a magnet, then stirring. After the temperature is adjusted and stabilized to 80° C., adding 10 ml aqueous solution of 0.03 g KPS drop by drop with a syringe, and reacting for 8 hours;

2) washing the reaction product obtained in step 1) with anhydrous ethanol twice, then washing with deionized water once to obtain PS-DVB nano-microspheres with an average particle size of 450 nm, preparing a PS-DVB nano-microsphere emulsion with a concentration of 10%, then placing in a 50 mL centrifuge tube for later use (FIG. 1);

3) assisting PEG crystallization in the mixed solution by a dropping film method or a vertical deposition method in order to induce the orderly arrangement of the PS-DVB nano-microspheres according to a growth direction of PEG crystal, specifically:

Inducing the orderly arrangement of the PS-DVB nano-microspheres by means of PEG crystallization, with the assistance of a dripping film method that includes: preparing 4 ml PEG2000 aqueous solution with a concentration of 30%, then adding 1 mL PS-DVB nano- microsphere emulsion with an average particle size of 450 nm and a concentration of 10% obtained in step 2) and thoroughly mixing to obtain the mixed solution(solution-state PEG crystallization in FIG. 2). Taking a drop of the mixed solution with a dropper, dropping on a pretreated glass substrate (after immersing in concentrated sulfuric acid, respectively washing with deionized water and anhydrous ethanol, cutting to a suitable size with a glass knife and immersing in anhydrous ethanol for later use), placing the glass substrate in an oven at 30° C. and drying to obtain a grown composite film; the PS-DVB nano-microspheres are arranged orderly according to a growth direction of dendritic PEG crystal on the composite film (FIG. 3).

Inducing the orderly arrangement of the PS-DVB nano-microspheres by means of PEG crystallization, with the assistance of a vertical deposition method that includes: preparing 4 ml PEG2000 aqueous solution with a concentration of 30%, and mixing the PEG2000 aqueous solution with 1 mL PS-DVB nano-microsphere emulsion with an average particle size of 450 nm and a concentration of 10% obtained in step 2) to obtain a mixed solution. The mixed solution is then kept in a 50 ml centrifugal tube. Blow-drying a pretreated glass substrate (after immersing in concentrated sulfuric acid for 24 hours, respectively washing with deionized water and anhydrous ethanol, cutting to a suitable size with a glass knife and immersing in anhydrous ethanol for later use) with nitrogen gas, vertically inserting the glass substrate into the mixed solution, and drying in an oven at 40° C. for 24 hours to obtain a grown composite film; the PS-DVB nano-microspheres are arranged orderly according to a growth direction of dendritic PEG crystal on the composite film.

Embodiment 2

1) After adding 2 mL PS and 0.03 mL DVB into a 150 ml three-neck flask, adding 40 mL deionized into the three-neck flask, mounting the three-neck flask, installing a condenser on the three-neck flask, after filling the condenser with cooling water and the three-neck flask with nitrogen gas, adding a magnet, then stirring. After the temperature is adjusted and stabilized to 80° C., adding 10 ml aqueous solution of 0.03 g KPS drop by drop with a syringe, and reacting for 10 hours;

2) washing the reaction product obtained in step 1) with anhydrous ethanol twice, then washing with deionized water once to obtain PS-DVB nano-microspheres with an average particle size of 450 nm, preparing a PS-DVB nano-microsphere emulsion with a concentration of 12%, then placing in a 50 mL centrifuge tube for later use;

3) assisting PEG crystallization in the mixed solution by a dripping film method or a vertical deposition method in order to induce the orderly arrangement of the PS-DVB nano-microspheres according to a growth direction of PEG crystal, specifically:

Inducing the orderly arrangement of the PS-DVB nano-microspheres by means of PEG crystallization, with the assistance of a dripping film method that includes: preparing 4 ml PEG2000 aqueous solution with a concentration of 20%, then adding 1 mL PS-DVB nano-microsphere emulsion with an average particle size of 450 nm and a concentration of 10% obtained in step 2), and thoroughly mixing to obtain a mixed solution. Taking a drop of the mixed solution with a dropper, dropping on a pretreated glass substrate (after immersing in concentrated sulfuric acid, respectively washing with deionized water and anhydrous ethanol, cutting to a suitable size with a glass knife and immersing in anhydrous ethanol for later use), placing the glass substrate in an oven at 30° C. and drying to obtain a grown composite film; the PS-DVB nano-microspheres are arranged orderly according to a growth direction of dendritic PEG crystal on the composite film.

Inducing the orderly arrangement of the PS-DVB nano-microspheres by means of PEG crystallization, with the assistance of a vertical deposition method that includes: preparing 4 ml PEG2000 aqueous solution with a concentration of 20%, then adding 1 mL PS-DVB nano-microsphere emulsion with an average particle size of 450 nm and a concentration of 10% obtained in step 2) to obtain a mixed solution. The mixed solution is then kept in a 50 ml centrifugal tube. Blow-drying a pretreated glass substrate (after immersing in concentrated sulfuric acid for 24 hours, respectively washing with deionized water and anhydrous ethanol, cutting to a suitable size with a glass knife and immersing in anhydrous ethanol for later use) with nitrogen gas, vertically inserting the glass substrate into the mixed solution, and drying in an oven at 40° C. for 24 hours to obtain a grown composite film; the PS-DVB nano-microspheres are arranged orderly according to a growth direction of dendritic PEG crystal on the composite film.

Embodiment 3

1) After adding 2 mL PS and 0.025 mL DVB into a 150 ml three-neck flask, adding 40 mL deionized water into the three-neck flask, mounting the three-neck flask, installing a condenser on the three-neck flask, after filling the condenser with cooling water and the three-neck flask with nitrogen gas, adding a magnet, then stirring. After the temperature is adjusted and stabilized to 80° C., adding 10 ml aqueous solution of 0.03 g KPS drop by drop with a syringe, and reacting for 10 hours;

2) washing the reaction product obtained in step 1) with anhydrous ethanol twice, then washing with deionized water once to obtain PS-DVB nano-microspheres with an average particle size of 420 nm, preparing a PS-DVB nano-microsphere emulsion with a concentration of 10%, then placing in a 50 mL centrifuge tube for later use;

3) assisting PEG crystallization in the mixed solution by a dripping film method or a vertical deposition method in order to induce the orderly arrangement of the PS-DVB nano-microspheres according to a growth direction of PEG crystal, specifically:

Inducing the orderly arrangement of the PS-DVB nano-microspheres by means of PEG crystallization, with the assistance of a dripping film method that includes: preparing 4 ml PEG2000 aqueous solution with a concentration of 10%, then adding 1 mL PS-DVB nano-microsphere emulsion with an average particle size of 420 nm and a concentration of 10% obtained in step 2) and thoroughly mixing to obtain a mixed solution. Taking a drop of the mixed solution with a dropper, dropping on a pretreated glass substrate (after immersing in concentrated sulfuric acid, respectively washing with deionized water and anhydrous ethanol, cutting to a suitable size with a glass knife and immersing in anhydrous ethanol for later use), placing the glass substrate in an oven at 30° C. and drying to obtain a grown composite film; the PS-DVB nano-microspheres are arranged orderly according to a growth direction of dendritic PEG crystal on the composite film.

Inducing the orderly arrangement of the PS-DVB nano-microspheres by means of PEG crystallization, with the assistance of a vertical deposition method that includes: preparing 4 ml PEG2000 aqueous solution with a concentration of 10%, and mixing the PEG2000 aqueous solution with 1 mL PS-DVB nano-microsphere emulsion with an average particle size of 420 nm and a concentration of 10% obtained in step 2) to obtain a mixed solution. The mixed solution is then kept in a 50 ml centrifugal tube. Blow-drying a pretreated glass substrate (after immersing in concentrated sulfuric acid for 24 hours, respectively washing with deionized water and anhydrous ethanol, cutting to a suitable size with a glass knife and immersing in anhydrous ethanol for later use) with nitrogen gas, vertically inserting the glass substrate into the mixed solution, and drying in an oven at 40° C. for 24 hours to obtain a grown composite film; the PS-DVB nano-microspheres are arranged orderly according to a growth direction of dendritic PEG crystal on the composite film.

Embodiment 4

1) After adding 1 mL PS and 0.02 mL DVB into a 150 ml three-neck flask, adding 30 mL deionized water into the three-neck flask, mounting the three-neck flask, installing a condenser on the three-neck flask, after filling the condenser with cooling water and the three-neck flask with nitrogen gas, adding a magnet, then stirring. After the temperature is adjusted and stabilized to 80° C., adding 10 ml aqueous solution of 0.02 g KPS drop by drop with a syringe, and reacting for 8 hours;

2) washing the reaction product obtained in step 1) with anhydrous ethanol twice, then washing with deionized water once to obtain PS-DVB nano-microspheres with an average particle size of 400 nm, preparing a PS-DVB nano-microsphere emulsion with a concentration of 8%, and then placing in a 50 mL centrifuge tube for later use;

3) assisting PEG crystallization in the mixed solution by a dripping film method or a vertical deposition method, in order to induce the orderly arrangement of the PS-DVB nano-microspheres according to a growth direction of PEG crystal, specifically:

Inducing the orderly arrangement of the PS-DVB nano-microspheres by means of PEG crystallization, with the assistance of a dripping film method: preparing 4 ml PEG2000 aqueous solution with a concentration of 5%, then adding 1 mL PS-DVB nano-microsphere emulsion with an average particle size of 400 nm and with a concentration of 8% obtained in step 2), and thoroughly mixing to obtain a mixed solution. Taking a drop of the mixed solution with a dropper, dropping on a pretreated glass substrate (after immersing in concentrated sulfuric acid, respectively washing with deionized water and anhydrous ethanol, cutting to a suitable size with a glass knife, immersing in anhydrous ethanol for later use), placing the glass substrate in an oven at 30° C. and drying to obtain a grown composite film; the PS-DVB nano-microspheres are arranged orderly according to a growth direction of dendritic PEG crystal on the composite film.

Inducing the orderly arrangement of the PS-DVB nano-microspheres by means of PEG crystallization, with the assistance of a vertical deposition method that includes: preparing 4 ml PEG2000 aqueous solution with a concentration of 5%, and mixing the PEG2000 aqueous solution with 1 mL PS-DVB nano-microsphere emulsion with a average particle size of 400 nm and a concentration of 8% obtained in step 2) to obtain a mixed solution. The mixed solution is then kept in a 50 ml centrifugal tube. Blow-drying a pretreated glass substrate (after immersing in concentrated sulfuric acid for 24 hours, respectively washing with deionized water and anhydrous ethanol, cutting to a suitable size with a glass knife, immersing in anhydrous ethanol for later use) with nitrogen gas, vertically inserting the glass substrate into the mixed solution, and drying in an oven at 40° C. for 24 hours to obtain a grown composite film; the PS-DVB nano-microspheres are arranged orderly according to a growth direction of a dendritic PEG crystal on the composite film.

Embodiment 5

1) After adding 1 mL PS and 0.02 mL DVB into a 150 ml three-neck flask, adding 40 mL deionized water into the three-neck flask, mounting the three-neck flask, installing a condenser on the three-neck flask, after filling the condenser with cooling water and the three-neck flask with nitrogen gas, adding a magnet, then stirring. After the temperature is adjusted and stabilized to 80° C., adding 10 ml aqueous solution of 0.02 g KPS drop by drop with a syringe, and reacting for 8 hours;

2) washing the reaction product obtained in step 1) with anhydrous ethanol twice, then washing with deionized water once to obtain PS-DVB nano-microspheres each with an average particle size of 400 nm, preparing a PS-DVB nano-microsphere emulsion with concentration of 10%, then placing in a 50 mL centrifuge tube for later use;

3) assisting PEG crystallization in the mixed solution by a dripping film method or a vertical deposition method in order to induce the orderly arrangement of the PS-DVB nano-microspheres according to a growth direction of PEG crystal, specifically:

Inducing the orderly arrangement of the PS-DVB nano-microspheres by means of PEG crystallization, with the assistance of a dripping film method that includes: preparing 4 ml PEG2000 aqueous solution with a concentration of 1%, then adding 1 mL PS-DVB nano-microsphere emulsion with an average particle size of 400 nm and a concentration of 10% obtained in step 2) and thoroughly mixing to obtain a mixed solution. Taking a drop of the mixed solution with a dropper, dropping on a pretreated glass substrate (after immersing in concentrated sulfuric acid, respectively washing with deionized water and anhydrous ethanol, cutting to a suitable size with a glass knife and immersing in anhydrous ethanol for later use), placing the glass substrate in an oven at 30° C. and drying to obtain a grown composite film; the PS-DVB nano-microspheres are arranged orderly according to a growth direction of dendritic PEG crystal on the composite film.

Inducing the orderly arrangement of the PS-DVB nano-microspheres, by means of PEG crystallization, with the assistance of a vertical deposition method that includes: preparing 4 ml aqueous PEG2000 solution with a concentration of 1%, and mixing the PEG2000 aqueous solution with 1 mL PS-DVB nano-microsphere emulsion with an average particle size of 400 nm and a concentration of 10% obtained in step 2) to obtain a mixed solution. The mixed solution is then kept in a 50 ml centrifugal tube. Blow-drying a pretreated glass substrate (after immersing in concentrated sulfuric acid for 24 hours, respectively washing with deionized water and anhydrous ethanol, cutting to a suitable size with a glass knife and immersing in anhydrous ethanol for later use) with nitrogen gas, vertically inserting the glass substrate into the mixed solution, and drying in an oven at 40° C. for 24 hours to obtain a grown composite film; the PS-DVB nano-microspheres are arranged orderly according to a growth direction of a dendritic PEG crystal on the composite film.

In the present invention, any numerical ranges include all values in the range.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method for inducing orderly arrangement of nano-microspheres by polymer crystallization, comprising:
   mixing a PS-DVB nano-microsphere emulsion with a concentration of 8-12% and a polyethylene glycol (PEG) aqueous solution with a concentration of 1-30% in a volume ratio of 1:3-5 to obtain a mixed solution, and inducing the orderly arrangement of PS-DVB nano-microspheres comprised in the PS-DVB nano-microsphere emulsion according to a crystal growth direction of PEG crystal through PEG crystallization in the mixed solution.

2. The method of claim 1, wherein the PS-DVB nano-microsphere emulsion with a concentration of 8-12% is obtained by a method that comprises:
   1) mixing polystyrene (PS) and divinylbenzene (DVB), adding deionized water, adjusting temperature to 75-85° C. under conditions of nitrogen gas protection, stirring and reflux condensation, then adding an initiator aqueous solution with a potassium persulfate concentration of 0.002-0.003 g/ml drop by drop and reacting for 8-10 hours, wherein a volume ratio of the PS, the DVB and the initiator aqueous solution is in a range of 1-2:0.02-0.03:9-11;
   2) washing a reaction product obtained in step 1) to obtain a plurality of PS-DVB nano-microspheres and preparing the PS-DVB nano-microsphere emulsion.

3. The method of claim 2, wherein the PEG crystallization in the mixed solution is assisted by a dripping film method that includes: dropping the mixed solution on a pretreated flat glass substrate, and drying the glass substrate under a temperature of 20-40° C., inducing the orderly arrangement of the PS-DVB nano-microspheres according to the crystal growth direction of the PEG crystal through the PEG crystallization, and obtaining a composite film formed by the orderly arrangement of the PS-DVB nano-microspheres according to the crystal growth direction of the PEG crystal on the glass substrate.

4. The method of claim 2, wherein the PEG crystallization in the mixed solution is assisted by a vertical deposition method that includes: vertically inserting a pretreated glass substrate, drying under a temperature of 30-50° C. for 22-26 hours, inducing the orderly arrangement of the PS-DVB nano-microspheres according to the crystal growth direction of the PEG crystal through the PEG crystallization, and obtaining a composite film formed by the orderly arrangement of the PS-DVB nano-microspheres according to the crystal growth direction of the PEG crystal on the glass substrate.

5. The method of claim 1, wherein the PEG is PEG2000.

6. The method of claim 1, wherein an average particle size of the PS-DVB nano-microspheres is in a range of 400-500 nm.

7. The method of claim 1, wherein the PEG crystallization in the mixed solution is assisted by a dripping film method that includes: dropping the mixed solution on a pretreated flat glass substrate, and drying the glass substrate under a temperature of 20-40° C., inducing the orderly arrangement of the PS-DVB nano-microspheres according to the crystal growth direction of the PEG crystal through the PEG crystallization, and obtaining a composite film formed by the orderly arrangement of the PS-DVB nano-microspheres according to the crystal growth direction of the PEG crystal on the glass substrate.

8. The method of claim 1, wherein the PEG crystallization in the mixed solution is assisted by a vertical deposition method that includes: vertically inserting a pretreated glass substrate, drying under a temperature of 30-50° C. for 22-26 hours, inducing the orderly arrangement of the PS-DVB nano-microspheres according to the crystal growth direction of the PEG crystal through the PEG crystallization, and obtaining a composite film formed by the orderly arrangement of the PS-DVB nano-microspheres according to the crystal growth direction of the PEG crystal on the glass substrate.

* * * * *